United States Patent
Tsunoda

(10) Patent No.: US 10,061,490 B2
(45) Date of Patent: Aug. 28, 2018

(54) COMMODITY RECOGNITION APPARATUS AND COMMODITY RECOGNITION METHOD

(71) Applicant: TOSHIBA TEC KABUSHIKI KAISHA, Shinagawa-ku, Tokyo (JP)

(72) Inventor: Youji Tsunoda, Izunokuni (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/201,650

(22) Filed: Jul. 5, 2016

(65) Prior Publication Data

US 2016/0313897 A1    Oct. 27, 2016

Related U.S. Application Data

(62) Division of application No. 14/302,788, filed on Jun. 12, 2014, now abandoned.

(30) Foreign Application Priority Data

Jul. 12, 2013    (JP) .................................. 2013-146821

(51) Int. Cl.
*G06F 3/0484*    (2013.01)
*G06K 9/00*    (2006.01)
(Continued)

(52) U.S. Cl.
CPC ........... *G06F 3/04842* (2013.01); *G06K 9/00* (2013.01); *G06T 11/60* (2013.01);
(Continued)

(58) Field of Classification Search
CPC ...... G06K 9/00; G06K 2209/17; G06T 11/60; G06F 3/04842; H04N 5/23293
See application file for complete search history.

(56) References Cited

U.S. PATENT DOCUMENTS

| 5,546,475 A | 8/1996 | Bolle et al. |
| 9,036,870 B2 | 5/2015 | Sugasawa et al. |

(Continued)

FOREIGN PATENT DOCUMENTS

| JP | 2001-216571 | 8/2001 |
| JP | 2012-069092 | 4/2012 |

(Continued)

OTHER PUBLICATIONS

First Office Action for Japanese Patent Application No. 2013-146821 dated Apr. 14, 2015, 8 pages.

(Continued)

*Primary Examiner* — Katrina Fujita
(74) *Attorney, Agent, or Firm* — Amin, Turocy & Watson LLP

(57) ABSTRACT

The commodity recognition apparatus displays a frame for surrounding a commodity in an image captured by an image capturing module. Then the commodity recognition apparatus recognizes a candidate of the commodity imaged in the frame according to the feature amount of the image in the area surrounded by the frame, and outputs information of a highest ranked candidate commodity. If a change instruction for the candidate is received, the commodity recognition apparatus outputs information of the commodity other than the highest ranked candidate selected from the candidates.

10 Claims, 14 Drawing Sheets

(51) Int. Cl.
*G06T 11/60* (2006.01)
*H04N 5/232* (2006.01)

(52) U.S. Cl.
CPC ..... *H04N 5/23293* (2013.01); *G06K 2209/17* (2013.01); *G06T 2200/24* (2013.01)

(56) References Cited

U.S. PATENT DOCUMENTS

| | | | |
|---|---|---|---|
| 9,165,202 B2 | 10/2015 | Sugasawa et al. | |
| 9,245,424 B2 | 1/2016 | Ueda et al. | |
| 2002/0194074 A1* | 12/2002 | Jacobs | G06Q 20/20 705/16 |
| 2012/0047039 A1 | 2/2012 | Sano et al. | |
| 2012/0243779 A1 | 9/2012 | Nakai et al. | |
| 2013/0057692 A1 | 3/2013 | Naito et al. | |
| 2013/0100295 A1 | 4/2013 | Naito et al. | |
| 2013/0101168 A1 | 4/2013 | Naito et al. | |
| 2013/0103509 A1* | 4/2013 | Naito | G07G 1/0054 705/16 |
| 2013/0182106 A1 | 7/2013 | Nakamichi et al. | |
| 2013/0208122 A1* | 8/2013 | Iizaka | H04N 7/18 348/150 |
| 2013/0223680 A1* | 8/2013 | Sugasawa | G07G 1/0045 382/103 |
| 2014/0023241 A1 | 1/2014 | Sugasawa et al. | |
| 2014/0126775 A1 | 5/2014 | Kakino | |

FOREIGN PATENT DOCUMENTS

| | | |
|---|---|---|
| JP | 2012-252396 | 12/2012 |
| JP | 2013-089090 | 5/2013 |

OTHER PUBLICATIONS

Non-Final Office Action for U.S. Appl. No. 14/302,788 dated Nov. 20, 2015, 33 pages.
Final Office Action for U.S. Appl. No. 14/302,788 dated Apr. 12, 2016, 24 pages.

* cited by examiner

FIG.3

| MENU ID | MENU NAME | PRICE | CALORIE | APPEARANCE FEATURE PARAMETER |
|---|---|---|---|---|
| 11111 | AA | 60 | 120 | 1100110011001100 |
| 22222 | BB | 50 | 200 | 1110001110001110 |
| 33333 | CC | 40 | 220 | 0011001100110011 |
| 44444 | DD | 80 | 250 | 0101010101010101 |
| | | | | |
| | | | | |

COMMODITY RECOGNITION APPARATUS AND COMMODITY RECOGNITION METHOD

CROSS-REFERENCE TO RELATED APPLICATIONS

This application is a Division of application Ser. No. 14/302,788 filed Jun. 12, 2014, the entire contents of which are incorporated herein by reference.

This application is based upon and claims the benefit of priority from Japanese Patent Application No. 2013-146821, filed Jul. 12, 2013, the entire contents of which are incorporated herein by reference.

FIELD

Embodiments described herein relate to a commodity recognition apparatus used in a dining facility such as a cafeteria and a commodity recognition method performed by the commodity recognition apparatus.

BACKGROUND

In a dining facility such as a cafeteria, prepared cooked food is taken up and placed on a tray by a user himself or herself or by a staff working in the cafeteria and then a checkout processing is carried out after all desired cooked food are taken up. Generally, a cashier registers the cooked food placed on the tray one by one to a cash register to carryout the checkout processing. However, there is a problem in the cafeteria that the checkout processing takes relatively much time to recognize cooked food, and thus various proposals are made to solve the problem. One of the conventionally proposed recognition apparatuses recognizes the container such as a dish on which the commodity (cooked food) is placed. Thus, the container is limited to one that can be recognized by the recognition apparatus. Therefore, the degree of freedom of selecting the container is also limited, and such commodity recognition is hardly to use.

BRIEF DESCRIPTION OF THE DRAWINGS

FIG. 3 is a schematic view illustrating the data structure of a recognition dictionary file;

DETAILED DESCRIPTION

Figure 1:
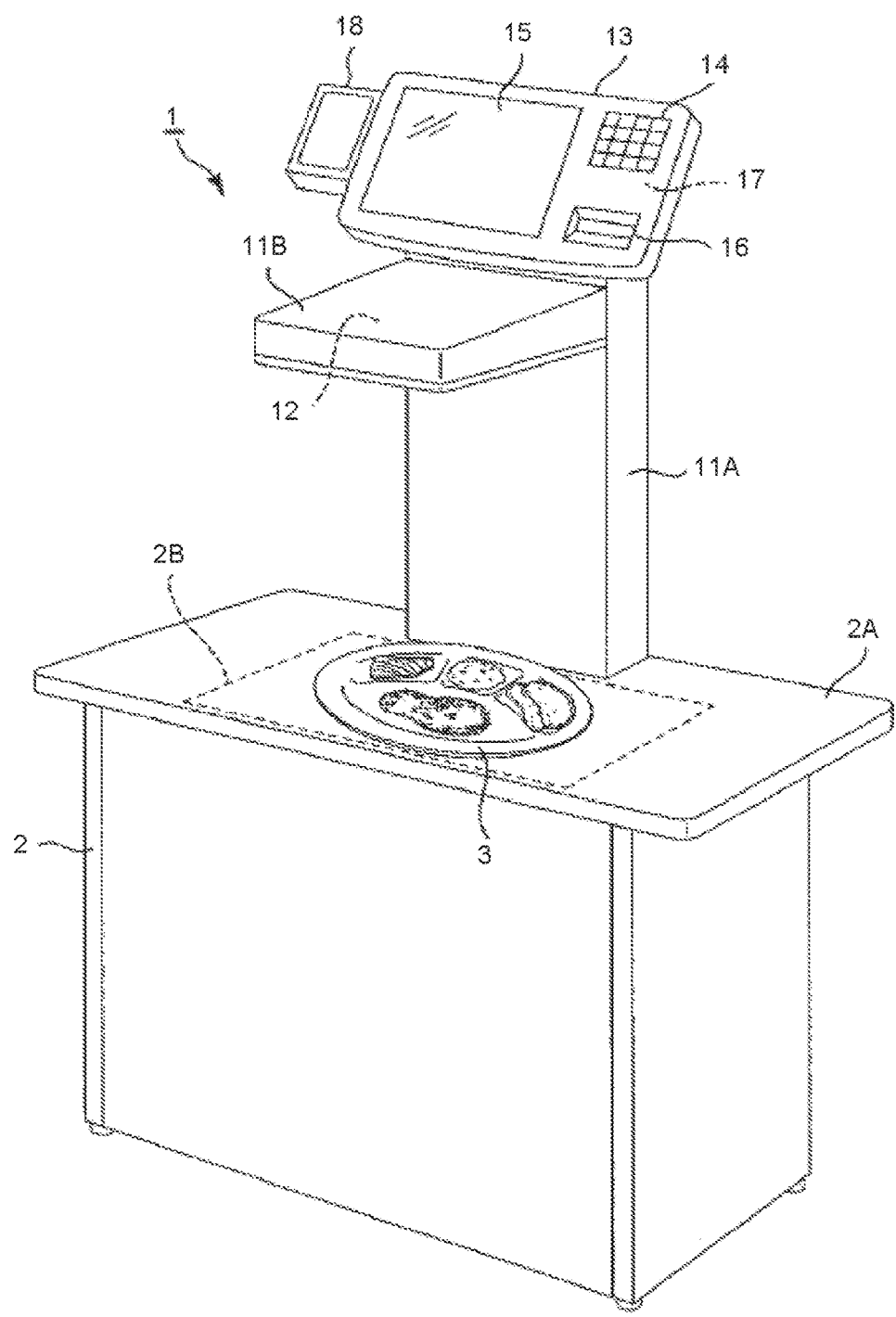
FIG. 1 is an external view illustrating a commodity recognition apparatus according to one embodiment.

In accordance with one embodiment, a commodity recognition apparatus comprises an image capturing module, an image display module, an input receiving module, a frame display module, a recognition module, a first output module, a change receiving module and a second output module. The image capturing module photographs an image capturing area including a commodity to capture an image thereof. The image display module displays the image captured by the image capturing module on a display module. The input receiving module receives a selection input on any position on the image displayed on the display module. The frame display module displays, on the image displayed on the display module, a frame for surrounding the commodity the selection input on which is received by the input receiving module. The recognition module recognizes a candidate of the commodity imaged in the frame according to the feature amount of the image in the area surrounded by the frame. The first output module outputs information of a best candidate commodity among the candidates of the commodity recognized by the recognition module. The change receiving module receives a change instruction for the candidate. The second output module outputs information of the commodity other than the best candidate selected from the candidates if the change instruction for the candidate is received.

The commodity recognition apparatus according to one embodiment is described below.

In the present embodiment, the commodity recognition apparatus is arranged in a dining facility such as a cafeteria for staff or a cafeteria for student.

First, the commodity recognition apparatus according to the present embodiment adopts an object recognition technology. The object recognition is a technology in which a target object is photographed by a camera to capture an image thereof and then the category and the like of the object is recognized according to the captured image data. A computer extracts appearance feature amount of the object contained in the image from the image data. Then, the computer compares the extracted appearance feature amount with the feature amount data of a reference image previously registered in a recognition dictionary file to calculate a similarity degree, and then recognizes the category and the like of the object based on the similarity degree. A technology for recognizing an object contained in an image is disclosed in the following document.

Keiji Yanai, "The current state and future directions on generic object recognition", Journal of Information Processing Society, Vol. 48, No. SIG16 [Search on Heisei 24 July 26], Internet <URL: http://mm.cs.uec.ac.jp/IPSJ-TCVIM-Yanai.pdf>

In addition, the technology carrying out the object recognition through area division of the image for each object is described in the following document.

Jamie Shotton etc, "Semantic Texton Forests for Image Categorization and Segmentation", [Search on Heisei 22 August 10], Internet <URL:http://citeseerx.ist.psu.edu/viewdoc/download?doi=10.1.1.145.3036&rep-repl&type=pdf>

FIG. 1 is an external view illustrating a commodity recognition apparatus 1 according to the present embodiment. The commodity recognition apparatus 1 arranged on a table surface 2A of a checkout counter 2 includes a plate-shaped body part 11A and an eaves part 11B. The body part 11A is vertically arranged along the edge of the rear side of the table surface 2A in such a manner that the front side thereof faces to the near side of a user to provide an area 2B of the table surface 2A between the front side and the user, as shown in FIG. 1. The eaves part 11B protrudes from the upper end part of the front side of the body part 11A in a direction substantially orthogonal to the front side. Thus, the underside of the eaves part 11B faces to the area of the table surface 2A.

An image capturing module 12 is arranged inside the eaves part 11B. Further, a reading window (not shown) is formed at the underside of the eaves part 11B. The image capturing module 12 comprises a CCD (Charge Coupled Device) image capturing element serving as an area image sensor and a drive circuit thereof, and an image capturing lens used for focusing the image of an image capturing area on the CCD image capturing element. The image capturing area refers to an area of an image focused on an area of the CCD image capturing element through the image capturing lens from the reading window. The image capturing module 12 outputs the image of the image capturing area focused on the CCD image capturing element through the image capturing lens. The image capturing module 12 is not limited to a module which uses the CCD image capturing element. For example, the image capturing module 12 may be a module which uses a CMOS (complementary metal oxide semiconductor) image sensor.

The commodity recognition apparatus 1 further comprises an operation panel 13 and an IC card reader/writer (hereinafter referred to as a card RW) 18. The operation panel 13 is arranged at the top of the body part 11A. The operation panel 13 takes the front side of the body part 11A as an operation surface. The operation panel 13 includes a keyboard 14, a touch panel 15 and a receipt issuing port 16 on the operation surface. The receipt issuing port 16 issues a receipt printed by a receipt printer 17 arranged inside the operation panel 13.

The card RW 18 is arranged at one side of the operation panel 13. The card RW 18 carries out a data writing and a data reading to and from an IC card. The IC card stores a unique user ID and electronic money data to realize a user ID function and an electronic money function. A user (a staff, student and the like) using the dining facility holds their own IC card.

The area 2B on the table surface 2A at the near side of the user serves as a space for putting a container 3 in which cooked food (commodity) is placed. The area 2B is included in the image capturing area of the image capturing module 12. The image capturing module 12 photographs the container 3, on which cooked food is placed, in the area 2B (image capturing area). No specific limitation is given to the shape and the number of the containers 3 although an oval shaped tray is shown as one example of the container 3 in FIG. 1. In a word, any dishes or trays can be used as long as the user can take dish or tray in which prepared cooked food is placed to the checkout counter 2 and put it in the area 2B.

Figure 2:
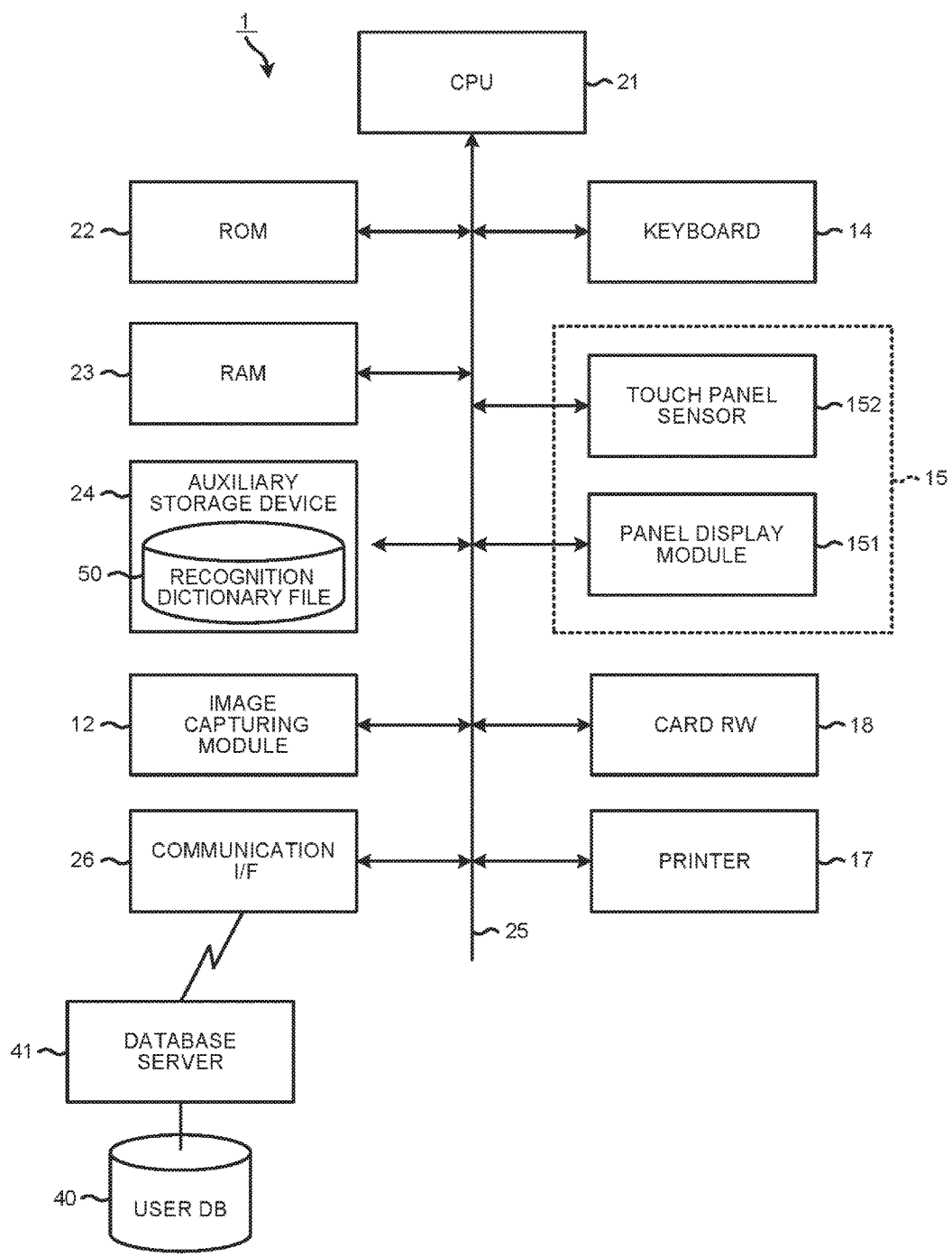
FIG. 2 is a block diagram illustrating the constitution of the main portions of the same commodity recognition apparatus shown in FIG. 1.

FIG. 2 is a block diagram illustrating the constitution of the main portions of the commodity recognition apparatus 1. The commodity recognition apparatus 1 comprises a CPU (Central Processing Unit) 21, a ROM (Read Only Memory) 22, a RAM (Random Access Memory) 23 and an auxiliary storage device 24. The commodity recognition apparatus 1 connects the CPU 21 with the ROM 22, the RAM 23 and the auxiliary storage device 24 through a bus line 25 such as an address bus, a data bus and the like.

The CPU 21 is a central part of a computer. The CPU 21 controls each module to achieve various functions of the commodity recognition apparatus 1 according to an operating system or an application program.

The ROM 22 is a main storage part of the computer. The ROM stores the operating system and the application program mentioned above. As occasion demands, the ROM 22 also stores data required to execute various processing by the CPU 21.

The RAM 23 is also a main storage part of the computer mentioned above. The RAM 23 stores data required to execute various processing by the CPU 21 as needed. Further, the RAM 23 is also used as a work area for the CPU 21 when various processing is executed.

The auxiliary storage device 24 is an auxiliary storage part of the computer. The auxiliary storage device 24 is, for example, an EEPROM (electric erasable programmable read-only memory), a hard disk drive, a SSD (solid state drive) and the like. The auxiliary storage device 24 stores data used by the CPU 21 to carry out various processing and data generated in the processing carried out by the CPU 21. As occasion demands, the auxiliary storage device 24 also stores the application programs mentioned above.

The commodity recognition apparatus 1 connects a communication interface 26 with the bus line 25. The commodity recognition apparatus 1 accesses a database server 41 through the communication interface 26. The database server 41 is provided with a user database 40 which stores personal information such as the sex, age and information relating to a personal usage history of the dining facility in association with the user ID of each user.

The commodity recognition apparatus 1 connects the image capturing module 12, the keyboard 14, the touch panel 15, the receipt printer 17 and the card RW 18 with each other through an input/output circuit (not shown). The touch panel 15 includes a panel display module 151 and a touch panel sensor 152 overlaid on the screen of the panel display module 151.

The commodity recognition apparatus 1 with such a constitution further includes a recognition dictionary file 50 which is stored in the auxiliary storage device 24. The storage of the recognition dictionary file 50 is not limited to the auxiliary storage device 24. For example, the recognition dictionary file 50 may also be stored in the RAM 23. Alternatively, the recognition dictionary file 50 may be stored in a storage device of an external machine connected with the commodity recognition apparatus 1 through the communication interface 26.

FIG. 3 is a schematic view illustrating the data structure of the recognition dictionary file 50. The recognition dictionary file 50 stores recognition dictionary data for each item of the cooked food provided by the dining facility for users. The recognition dictionary data contains items including a menu ID, menu name, price, calorie and appearance feature parameter. The menu ID is a code for individually identifying cooked food items. The menu name is a unique name of the cooked food item identified with the corresponding menu ID. The price is the sales price (Yen) per unit quantity of the cooked food item identified with the corresponding menu ID. The calorie is a parameter derived for the standard quantity of the cooked food item identified with the corresponding menu ID. The appearance feature parameter is obtained by parameterizing the appearance feature such as the standard shape, surface hue, pattern, concave-convex state and the like of the cooked food item identified with the corresponding menu ID.

Figure 4:
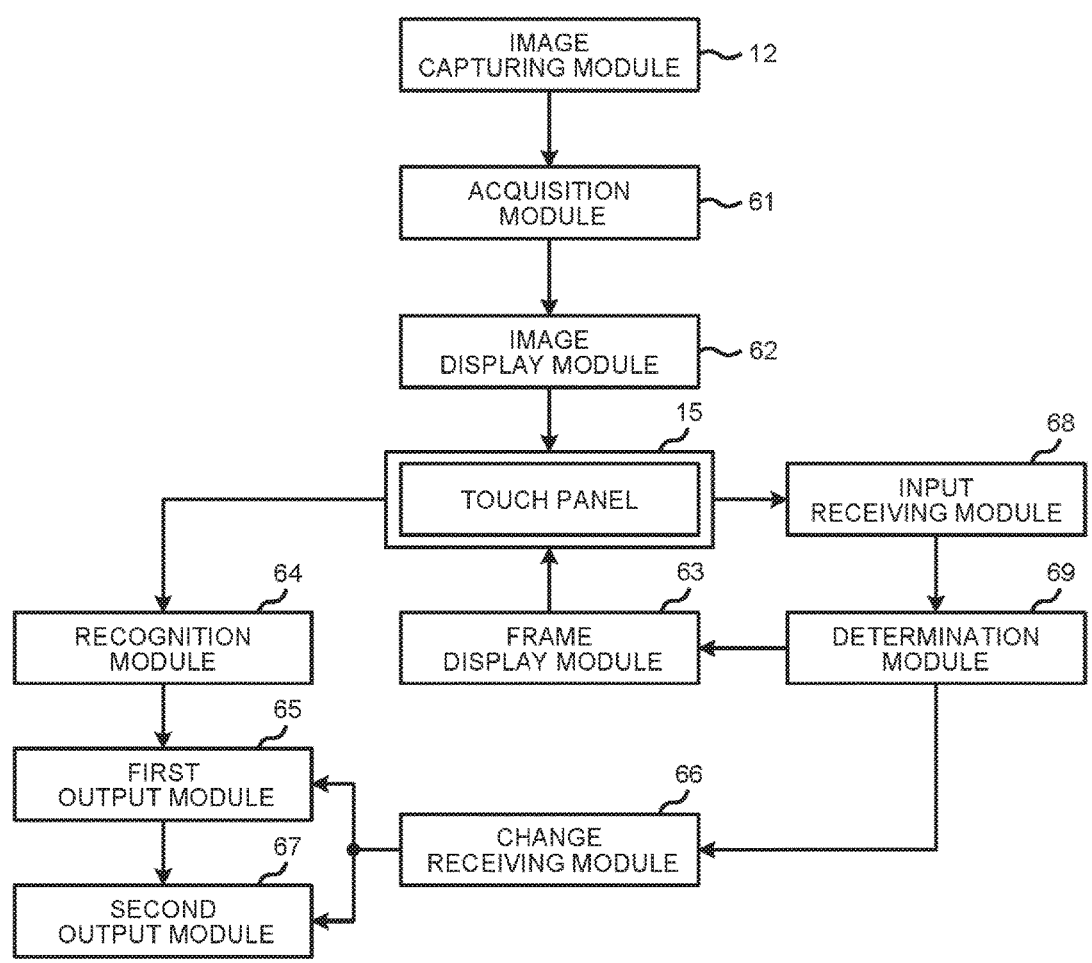
FIG. 4 is a functional block diagram illustrating the same commodity recognition apparatus.

As shown in FIG. 4, the commodity recognition apparatus 1 with such a constitution includes an acquisition module 61, an image display module 62, a frame display module 63, a recognition module 64, a first output module 65, a change receiving module 66, a second output module 67, an input receiving module 68 and a determination module 69.

The acquisition module 61 acquires an image captured by the image capturing module 12. The image display module 62 displays the image acquired by the acquisition module 61 on the touch panel 15 serving as a display module. The frame display module 63 displays frames for individually surrounding commodities (cooked food) at any one or multiple positions on the image displayed on the touch panel 15. The recognition module 64 recognizes a candidate of a commodity imaged in the frame according to the feature amount of the image in the area surrounded by the frame. The first output module 65 outputs information of the best or highest ranked candidate commodity among the candidates of the commodity recognized by the recognition module 64. The change receiving module 66 receives an instruction of changing the candidate of the commodity output by the first output module 65. The second output module 67 outputs information of the commodity other than the best candidate selected from the candidates of the commodity if the change receiving module 66 receives the instruction of changing the candidate of the commodity. The input receiving module 68 receives an instruction input to any position on the image displayed on the touch panel 15. The determination module 69 determines whether or not the position where the instruction input is received by the input receiving module 68 is inside the frame displayed by the frame display module 63. Then, if it is determined that the position is outside the frame, the frame display module 63 is operated, and if it is determined that the position is inside the frame, the change receiving module 66 is operated.

Figure 5:
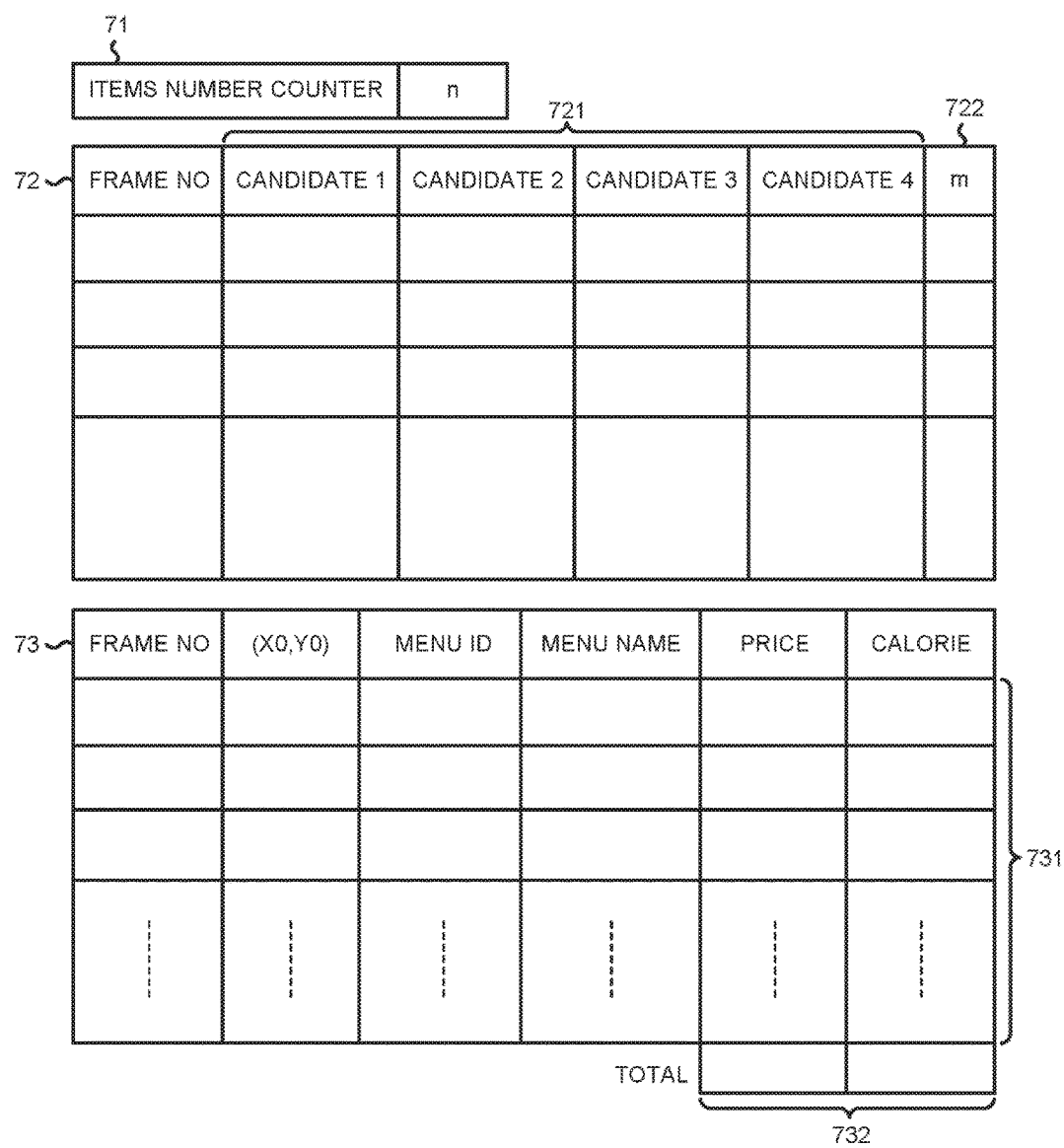
FIG. 5 is a schematic view illustrating a main memory area formed in a RAM of the same commodity recognition apparatus.
Figure 6:
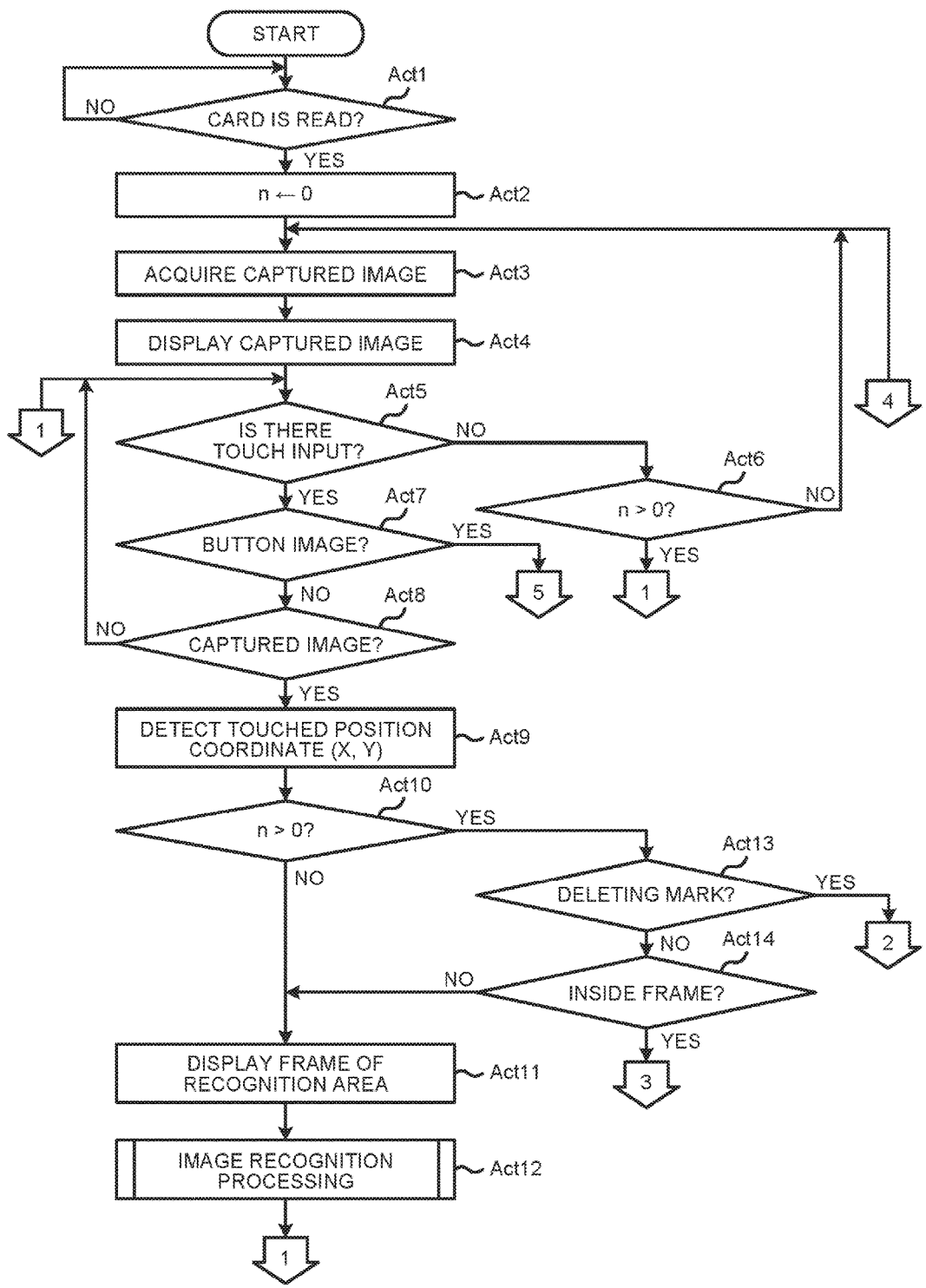
FIG. 6 is a flowchart illustrating the main portions of an information processing procedure executed by a CPU of the same commodity recognition apparatus according to a commodity recognition program.

In order to realize such a function, the commodity recognition apparatus 1 stores the commodity recognition program in the ROM 22 or the auxiliary storage device 24. Further, as shown in FIG. 5, the commodity recognition apparatus 1 forms a number of items counter 71 of a count value n, a candidate memory 72 and a detail memory 73 in the RAM 23.

The candidate memory 72 includes an area 721 which stores, in the order of the frame number, menu IDs of the menu items from the first candidate to the fourth candidate recognized in the image recognition processing described later, and an area 722 which stores a candidate number m.

The detail memory 73 includes an area 731 which stores, in the order of the frame number, a detail record including a deleting mark coordinate (X0, Y0), the menu ID, the menu name, the price, the calorie, and an area 732 which stores the total price and the total calorie. Each of the items is described later.

When the commodity recognition program is started, the CPU 21 starts the processing of procedures shown in the flowcharts in FIG. 6-FIG. 10. The content of the processing which is shown in FIG. 6-FIG. 10 and is described later is just an example, and the same result can be achieved by carrying out various processing properly.

The CPU 21 waits for the card RW 18 to read the IC card (ACT 1). The CPU 21 does not execute the processing in ACT 2 until the IC card is read (NO in ACT 1). If the IC card is read (YES in ACT 1), the CPU 21 execute the processing in ACT 2. The CPU 21 resets the number of items counter 71 to "0" (ACT 2).

The CPU 21 acquires the image (frame image) captured by the image capturing module 12 (ACT 3: acquisition module 61). Then the CPU 21 displays the captured image on the panel display module 151 of the touch panel 15 (ACT 4: image display module 62).

Figure 11:
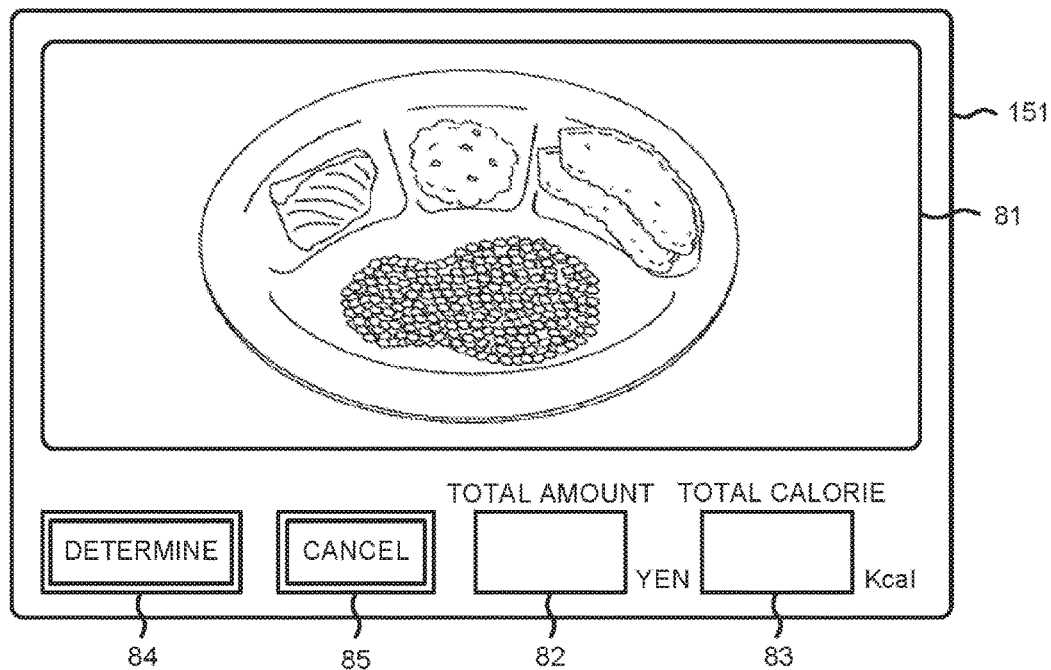
FIG. 11 is a schematic view illustrating an example of a screen displayed on a panel display module of the commodity recognition apparatus.

FIG. 11 is an example of a screen of the panel display module 151 on which a captured image 81 is displayed. As shown in FIG. 11, in addition to the captured image 81, a total amount column 82, a total calorie column 83, a "determine" button 84 and a "cancel" button 85 are also displayed on the screen.

When the captured image 81 is displayed on the screen of the panel display module 151, the CPU 21 confirms whether or not the screen is touched (ACT 5). If the screen is not touched (NO in ACT 5), the CPU 21 checks the content of the number of items counter 71 (ACT 6). If the number of items counter 71 is reset to "0" (NO in ACT 6), the CPU 21 returns to the processing in ACT 3. The CPU 21 acquires a next captured image from the image capturing module 12 (ACT 3), and then displays the image on the panel display module 151 (ACT 4).

The CPU 21 repeats the acquiring and displaying processing of the captured image until the screen is touched. If the screen is touched (YES in ACT 5), the CPU 21 checks which area of the screen is touched (ACT 7, ACT 8). If neither of the areas of the "determine" button 84 and the "cancel" button 85 is touched (NO in ACT 7), and the area of the captured image 81 is not touched (NO in ACT 8), the CPU 21 returns to the processing in ACT 5. Because the touch input is ignored.

If the area of the captured image 81 is touched (YES in ACT 8), the CPU 21 detects the coordinate (X, Y) of the touched position (ACT 9: input receiving module 68). The coordinate (X, Y) defines a reference point, for example, the lower-left corner of the area of the captured image 81 as the origin (0, 0) of the two-dimensional coordinate, the right direction from the origin (0, 0) as the X direction, and the upward direction as the Y direction. Then the CPU 21 calculates the distances from the origin (0, 0) to the touched position in the X direction and the Y direction, and then converts the distances into the coordinate (X, Y).

Figure 12:
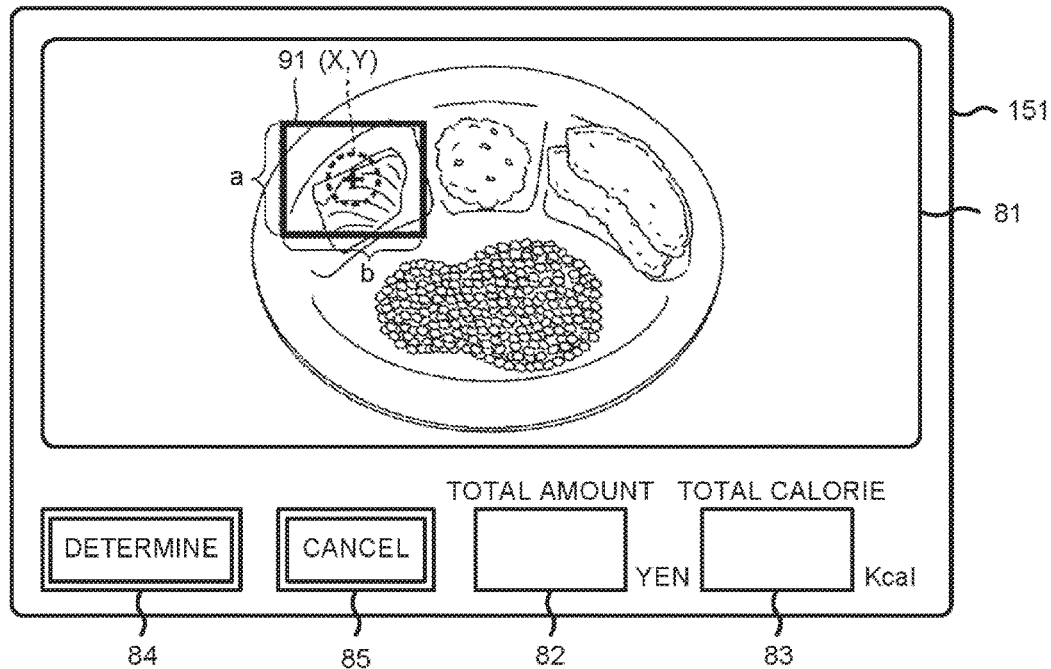
FIG. 12 is a schematic view illustrating an example of a screen displayed after a cooked food item is touched through the screen shown in FIG. 11.

The CPU 21 checks the number of items counter 71 (ACT 10). If the number of items counter 71 is reset to "0" (NO in ACT 10), the CPU 21 determines the recognition area of the image, and displays a frame 91 surrounding the recognition area in the captured image 81. As shown in FIG. 12, the CPU 21 displays the frame 91 in a rectangular shape of which the vertical length is "a" and the horizontal length is "b" by taking the touched position coordinate (X, Y) as a center thereof (ACT 11: frame display module 63). At this time, the color of the frame 91 is a default color, for example, black.

Figure 7:
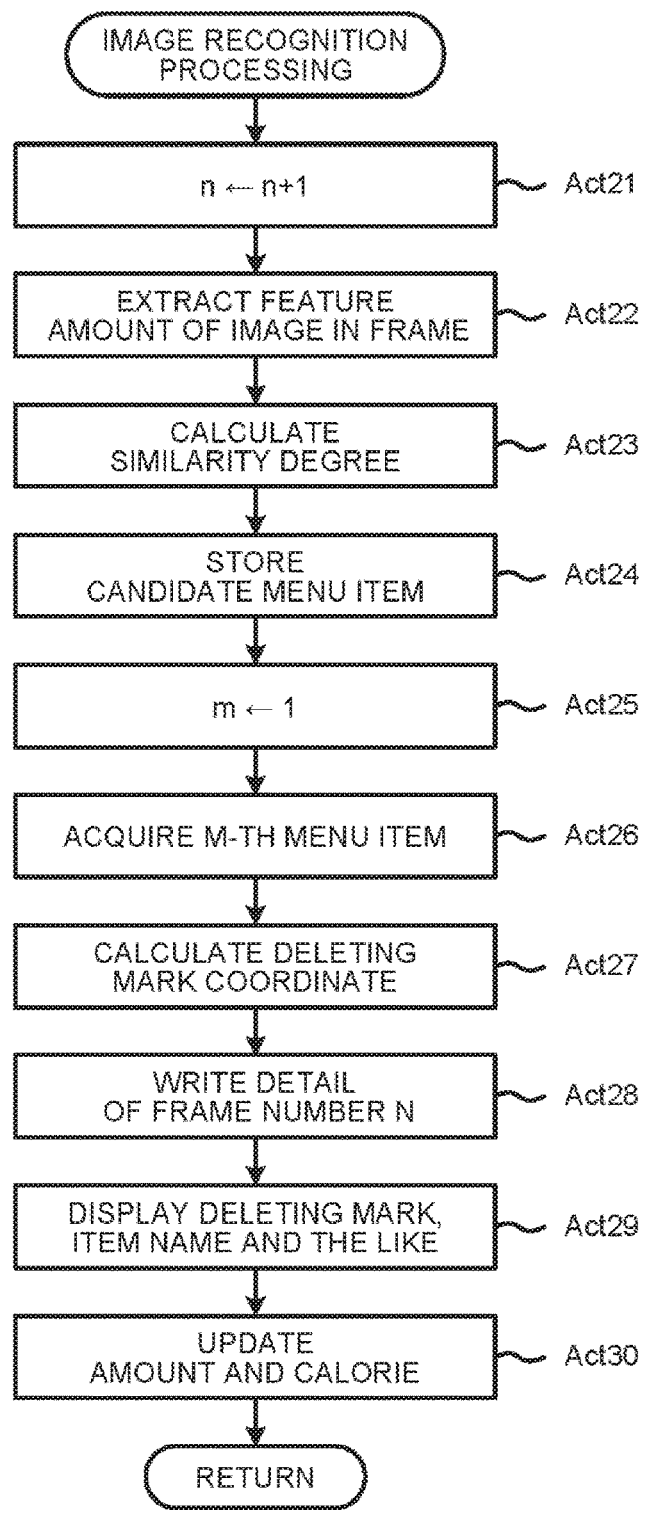
FIG. 7 is a flowchart specifically illustrating the procedure of image recognition processing shown in FIG. 6.

The CPU 21 executes image recognition processing (ACT 12). FIG. 7 is a flowchart illustrating a specific procedure of the image recognition processing. First, the CPU 21 increases the number of items counter 71 by "1" (ACT 21). Further, the CPU 21 extracts the appearance feature amount such as the contour shape, surface hue, pattern, concave-convex state and the like from the image surrounded by the frame 91 (ACT 22). Then the CPU 21 calculates, for the record of each menu item registered in the recognition dictionary file 50, a similarity degree indicating how much similar the feature amount is to the appearance feature parameter in the record (ACT 23).

If the similarity degree is calculated for all the menu items, the CPU 21 selects the first to the fourth menu items in the descending order of similarity degree. Then the menu IDs of the first to the fourth menu items are sequentially stored in the area 721 from the first candidate to the fourth candidate of the frame number n (n is the count value of the number of items counter 71) in the candidate memory 72 (ACT 24: recognition module 64). The menu ID of the menu item having the highest similarity degree is stored in the area of the first candidate, and the menu ID of the menu item having the second highest similarity degree is stored in the area of the second candidate. Sequentially, the menu ID of the menu item having the third highest similarity degree is stored in the area of the third candidate, and the menu ID of the menu item having the fourth highest similarity degree is stored in the area of the fourth candidate.

The CPU 21 sets the candidate number m of the frame number n in the candidate memory 72 to "1" (ACT 25). Then the CPU 21 acquires information of the menu item (menu ID, menu name, price and calorie) specified with the menu ID of the m-th candidate (m is the candidate number) from the recognition dictionary file 50 (ACT 26). Further, the CPU 21 calculates the coordinate of the upper-right corner of the frame 91 as the deleting mark coordinate (X0, Y0) (ACT 27).

Figure 13:
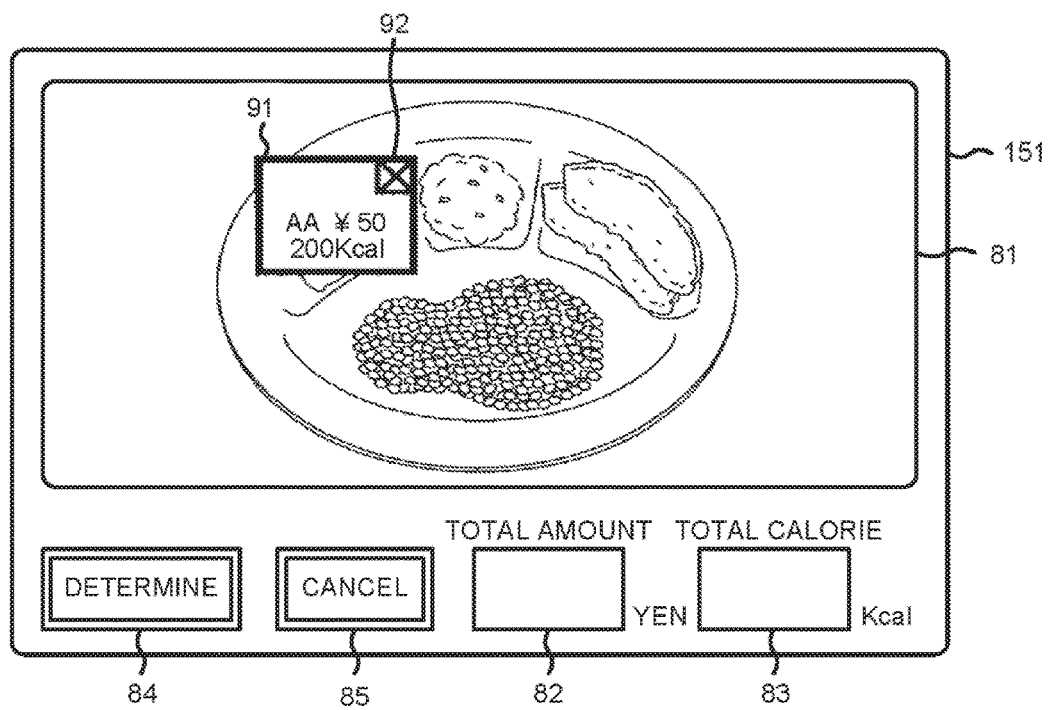
FIG. 13 is a schematic view illustrating an example of a screen displayed after the cooked food item is recognized from the screen shown in FIG. 12.

The CPU 21 sets the deleting mark coordinate (X0, Y0) and the menu item information in the detail record of the frame number n of the detail memory 73 (ACT 28). Next, as shown in FIG. 13, the CPU 21 displays a deleting mark 92 at the position of the deleting mark coordinate (X0, Y0). The CPU 21 displays the menu name, the price and the calorie of the menu item information in the frame 91 (ACT 29: first output module 65). Further, the CPU 21 calculates the total amount and the total calorie according to the data of the detail memory 73, and respectively displays the total amount and the total calorie in the total amount column 82 and the total calorie column 83 of the screen (ACT 30). Then, the image recognition processing is ended.

After the image recognition processing is ended, the CPU 21 returns to the processing in ACT 5. The CPU 21 confirms whether or not the screen of the panel display module 151 is touched (ACT 5). If the screen is not touched (NO in ACT 5), the CPU 21 checks the number of items counter 71 (ACT 6).

At this time, since the number of items counter 71 is increased from zero (0) (YES in ACT 6), the CPU 21 returns to the processing in ACT 5. Thus, the CPU 21 does not acquire the captured image. As a result, the former acquired captured image is maintained as a still image displayed on the panel display module 151.

If the screen is touched (YES in ACT 5), the CPU 21 checks which area of the screen is touched (ACT 7, ACT 8). If the area of the captured image 81 is touched again (YES in ACT 8), the CPU 21 detects the coordinate (X, Y) of the touched position (ACT 9). At this time, the number of items counter 71 is increased. Thus, "YES" is taken in the processing in ACT 10. The CPU 21 determines whether the deleting mark 92 is touched, the area inside the frame 91 of the recognition area is touched, or the area outside the frame 91 is touched (ACT 13, ACT 14: determination module 69).

Specifically, the CPU 21 compares the touched position coordinate (X, Y) with the deleting mark coordinate (X0, Y0) of each detail record stored in the detail memory 73. Then, if there exists a deleting mark coordinate (X0, Y0) which is substantially consistent with the touched position coordinate (X, Y), it is determined that the deleting mark 92 is touched. On the other hand, if the touched position coordinate (X, Y) is consistent with any one of the coordinates in the area of the frame 91, it is determined that the area inside the frame 91 is touched. If the touched position coordinate (X, Y) is not consistent with any one of the coordinates in the area of the frame 91, it is determined that the area outside the frame 91 is touched.

Figure 14:
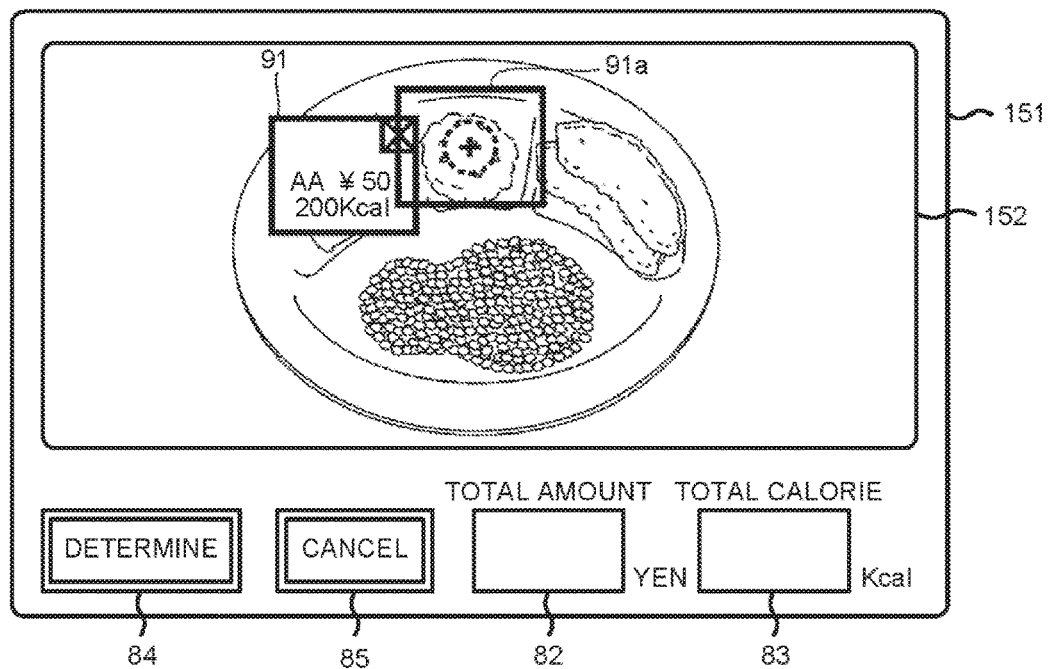
FIG. 14 is a schematic view illustrating an example of a screen displayed after other cooked food item is touched through the screen shown in FIG. 13.
Figure 15:
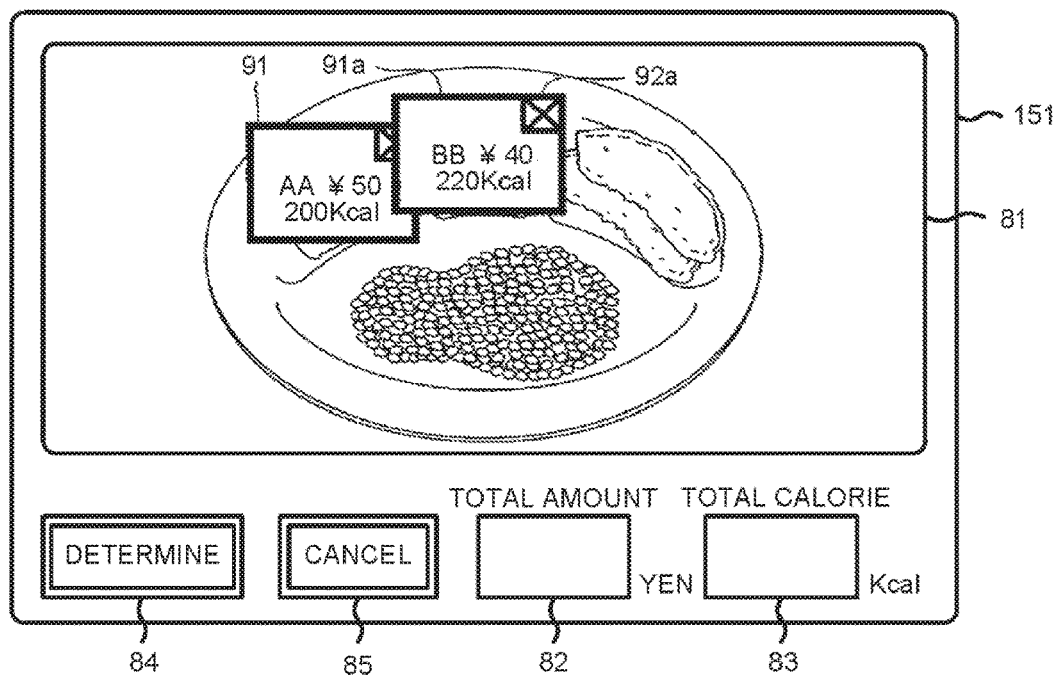
FIG. 15 is a schematic view illustrating an example of a screen displayed after the cooked food item is recognized from the screen shown in FIG. 14.

If it is determined that the area outside the frame 91 on the screen is touched (NO in ACT 13 and ACT 14), the CPU 21 executes the processing in ACT 11. As shown in FIG. 14, the CPU 21 displays a frame 91a in a rectangular shape of which the vertical length is "a" and the horizontal length is "b" by taking the touched position coordinate (X, Y) as a center thereof (ACT 11: frame display module 63). Then, the CPU 21 executes the image recognition processing for the image in the frame 91a. As a result, the content of the number of items counter (frame number n) is further increased. Sequentially, the menu IDs of the first to the fourth menu items in the descending order of similarity degree are stored in the area 721 from the first candidate to the fourth candidate of the frame number n of the candidate memory 72. Further, the deleting mark coordinate (X0, Y0) and information of the menu item of the first candidate (having the highest similarity degree) are set in the detail record of the frame number n of the detail memory 73. Then, as shown in FIG. 15, the menu name, the price and the calorie of the menu item information are displayed in the frame 91a. Further, the total amount and the total calorie are updated.

Figure 8:
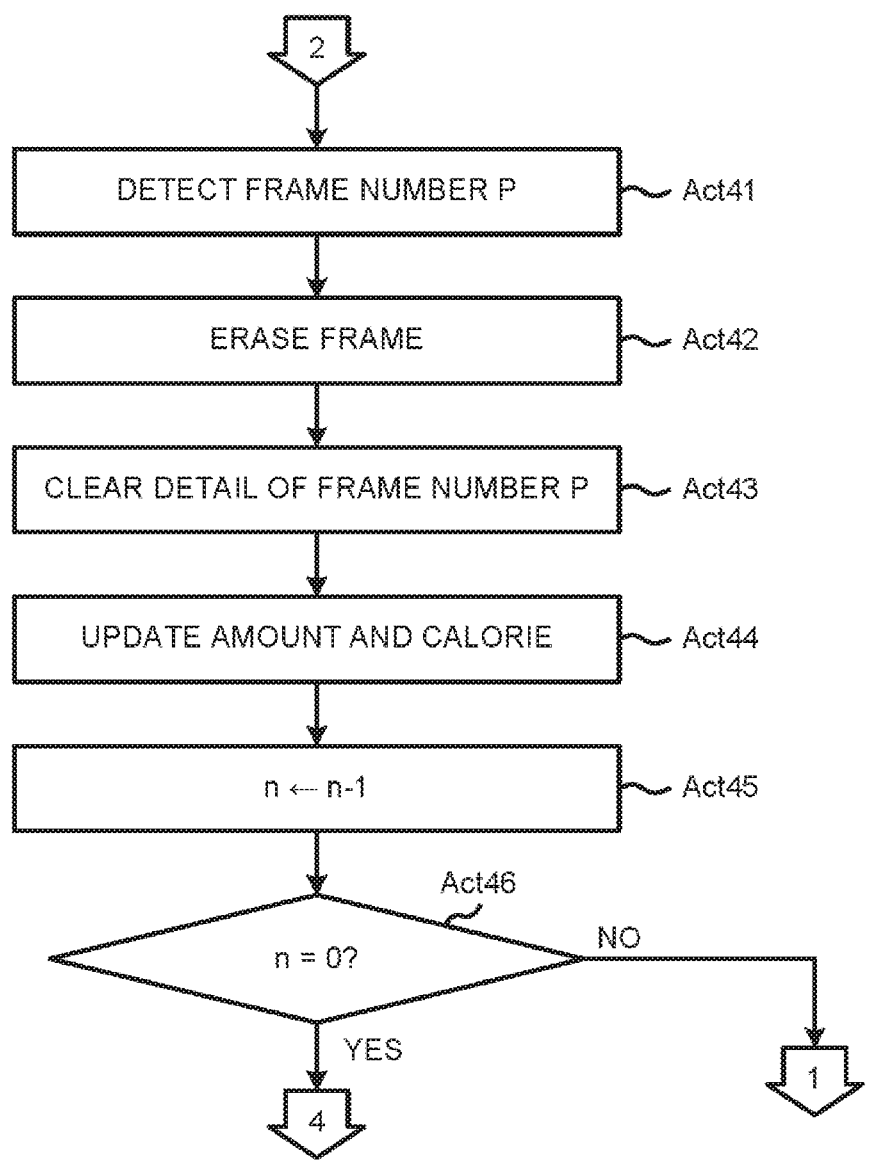
FIG. 8 is a flowchart illustrating an information processing procedure carried out after YES is taken in determination block ACT 13 shown in FIG. 6.

If it is determined that the deleting mark 92 is touched (YES in ACT 13), the CPU 21 executes the processing shown in the flowchart in FIG. 8. The CPU 21 detects a frame number P from the detail record containing the deleting mark coordinate (X0, Y0) which is substantially consistent with the touched position coordinate (X, Y) (ACT 41). Then the CPU 21 erases the frame 91 identified with the frame number P from the screen (ACT 42: erasing module 68). Further, the CPU 21 erases the record of the frame number P from the detail memory 73 (ACT 43). The CPU 21 recalculates the total amount and the total calorie according to the data of the detail memory 73 and updates the display of the total amount column 82 and the total calorie column 83 (ACT 44).

Sequentially, the CPU 21 decreases the number of items counter 71 by "1" (ACT 45). Then the CPU 21 confirms whether or not the count value n of the number of items counter 71 is "0" (ACT 46). If the count value n is not "0" (NO in ACT 46), the CPU 21 executes the processing in ACT 5. If the count value n is "0" (YES in ACT 46), the CPU 21 executes the processing in ACT 3.

If the count value n is not "0", the CPU 21 does not acquire a new captured image. Thus, the captured image displayed on the panel display module 151 is not changed. However, if the count value n is "0", the CPU 21 starts to acquire a captured image again. As a result, the captured image displayed on the panel display module 151 is updated to the newest image.

Figure 9:
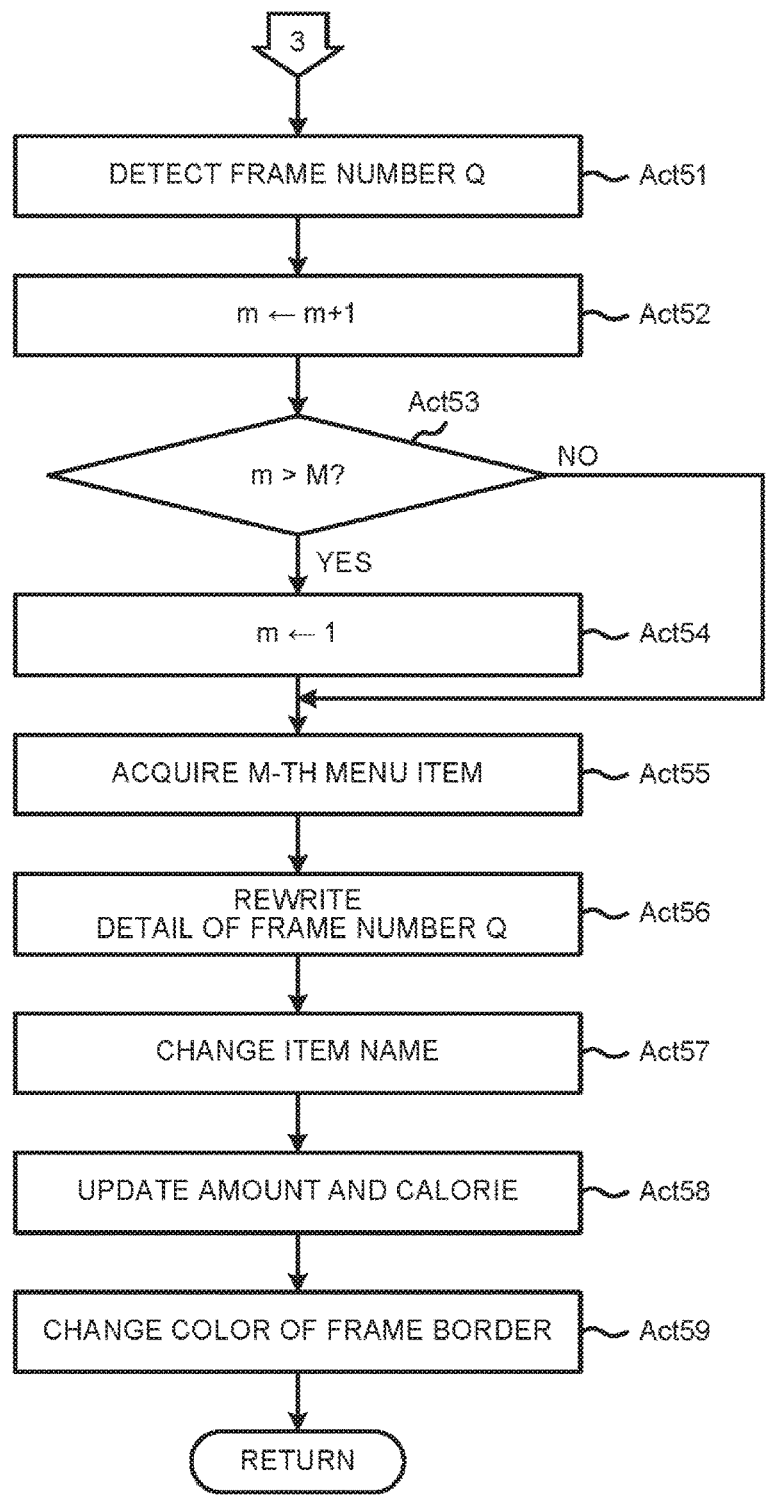
FIG. 9 is a flowchart illustrating an information processing procedure carried out after YES is taken in determination block ACT 14 shown in FIG. 6.
Figure 10:
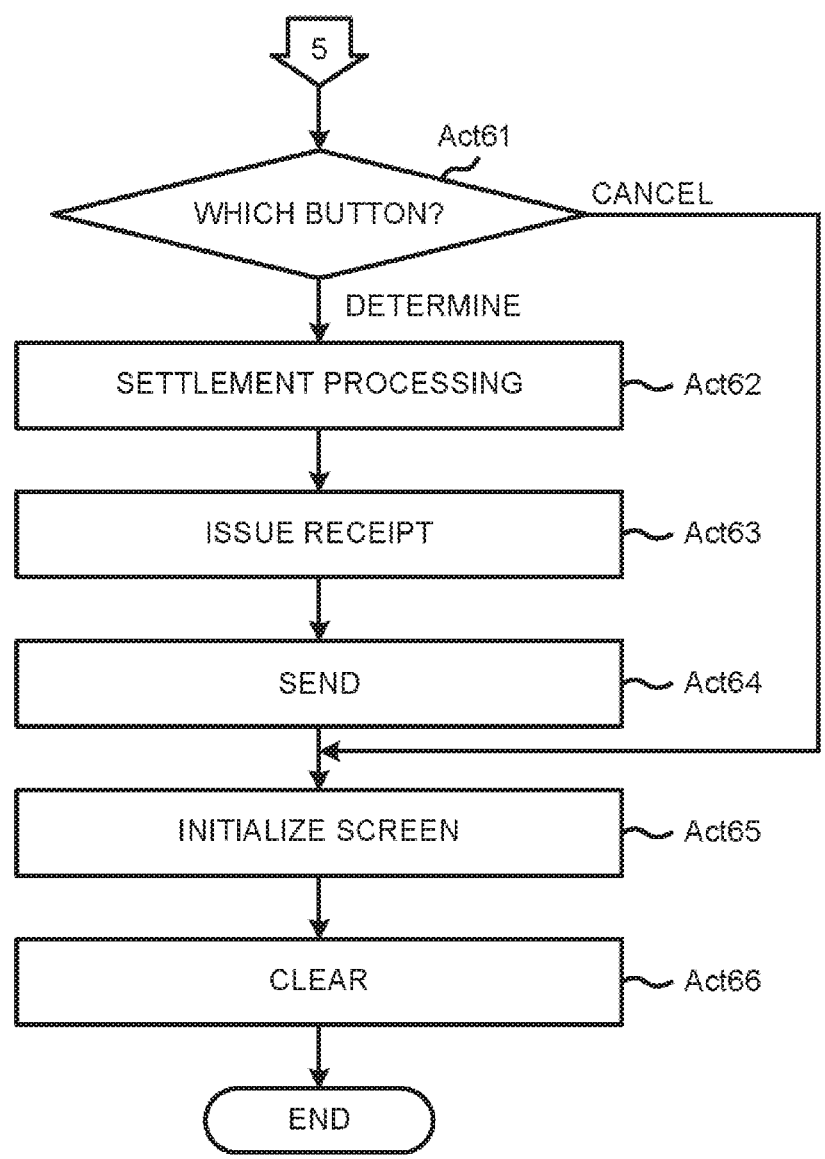
FIG. 10 is a flowchart illustrating an information processing procedure carried out after YES is taken in determination block ACT 7 shown in FIG. 6.

If it is determined that the area inside the frame 91 on the screen is touched (NO in ACT 13, YES in ACT 14: change receiving module 66), the processing shown in the flowchart in FIG. 9 is executed. The CPU 21 detects a frame number Q from the detail record containing the deleting mark coordinate (X0, Y0) forming the frame 91 in which the touched position coordinate (X, Y) exists (ACT 51). Then the CPU 21 adds "1" to the candidate number m corresponding to the frame number Q of the candidate memory 72 (ACT 52).

The CPU 21 determines whether or not the candidate number m is greater than the maximum value M ("4" in the present embodiment) of the number of candidates (ACT 53). Then if the candidate number m is greater than the maximum value M (YES in ACT 53), the CPU 21 resets the candidate number m to "1" (ACT 54). If the candidate number m is not greater than the maximum value M (NO in ACT 53), the candidate number m is not changed.

The CPU 21 acquires information of the menu item (menu ID, menu name, price and calorie) specified with the menu ID of the m-th candidate (m is the candidate number) from the recognition dictionary file 50 (ACT 55). Then the CPU 21 rewrites the menu item information in the detail record of the frame number n of the detail memory 73 to the current menu item information acquired (ACT 56: second output module 67). The CPU 21 changes the menu name, the price and the calorie displayed in the frame 91 of the frame number Q to the current menu item information acquired (ACT 57). Then the CPU 21 recalculates the total amount and the total calorie according to the data of the detail memory 73 and updates the values of the total amount column 82 and the total calorie column 83 (ACT 58). Further, the CPU 21 changes the color of the frame 91 of the frame number Q to the color corresponding to the m-th candidate (ACT 59). In the present embodiment, at least four different colors are prepared as the color of the frame 91, and the color of the frame 91 is changed according to the candidate order of the menu item displayed in the frame 91. Sequentially, the CPU 21 executes the processing in ACT 21.

Thus, every time the user touches the area inside the frame 91 on the screen, the menu item information in the frame is sequentially switched to information of the next menu item from the first rank thereof in the candidate order. Then, if the area inside the frame in which information of the menu item ranked at the last in the candidate order is displayed is further touched, the menu item information in the frame is switched back to information of the menu item ranked at the first in the candidate order.

If the button image is touched (YES in ACT 7), the CPU 21 confirms which one of the "determine" button 84 and the "cancel" button 85 is touched (ACT 61). If the "determine" button 84 is touched ("determine" in ACT 61), the CPU 21 executes each processing in ACT 62-ACT 64.

In ACT 62, the CPU 21 executes settlement processing with electronic money. The CPU 21 decreases data corresponding to the amount of the total price from the electronic money data of the IC card through the card RW 18. In ACT 63, the CPU 21 edits the receipt data based on the data of the detail memory 73. Then the CPU 21 outputs the receipt data to the printer 17 and controls the issuing of the receipt. In ACT 64, the CPU 21 edits the personal user history information using the data of the detail memory 73 and the user ID of the IC card. Then the CPU 21 sends the edited personal user history information to the database server 41 through the communication interface 26. In the database server 41, the edited personal user history information is stored for each user ID in the user database 40.

After the processing in ACT 62-ACT 64 is ended, the CPU 21 initializes the screen of the panel display module 151 (ACT 65). Further, the CPU 21 clears the candidate memory 72 and the detail memory 73 (ACT 66).

On the contrary, if the "cancel" button 85 is touched ("cancel" in ACT 61), the CPU 21 does not execute the processing in ACT 62-ACT 64 described above. The CPU 21 initializes the screen of the panel display module 151 (ACT 65). Further, the CPU 21 clears the candidate memory 72 and the detail memory 73 (ACT 66). In this way, the processing of the commodity recognition program for one user is ended.

In the cafeteria in which the commodity recognition apparatus 1 according to the present embodiment is arranged, the user puts the container 3 in which the cooked food is placed in the area 2B of the checkout counter 2. Then the user enables the card RW 18 to read the data of his or her own IC card. In this way, as shown in FIG. 11, the captured image 81 is displayed on the screen of the touch panel 15 and then, the user touches one by one the images of the cooked food placed on the container 3.

Assuming that the user touches the image of the cooked food placed at the upper-left of the container 3. As shown in FIG. 12, the frame 91 having the touched position coordinate (X, Y) as a center thereof is displayed on the captured image 81. Then in the commodity recognition apparatus 1, the recognition processing of the cooked food in the frame 91 is executed, and the menu items ranked from the first to the fourth in the candidate order in the descending order of similarity degree are selected. As shown in FIG. 13, the name, price and calorie of the menu item ranked at the first in the candidate order are displayed in the frame 91. Further, the deleting mark 92 is displayed in the frame 91. The total amount and the total calorie of the recognized cooked food are also displayed.

Next, assuming that the user touches the image of the cooked food placed at the upper-center of the container 3. As shown in FIG. 14, the frame 91a having the touched position coordinate (X, Y) as a center thereof is displayed on the captured image 81. In the commodity recognition apparatus 1, the recognition processing of the cooked food in the frame 91a is executed, and the menu items ranked from the first to the fourth in the descending candidate order of similarity degree are selected. Then, as shown in FIG. 15, the name, price and calorie of the menu item ranked at the first in the candidate order are displayed in the frame 91a. Further, a deleting mark 92a is displayed in the frame 91a. The total amount and the total calorie of the recognized cooked food are also added up.

Assuming that the user notices that information of the menu item displayed in the frame 91 is not the information of the cooked food placed at the upper-left of the container 3. In this case, there are a method of touching the deleting mark 92 in the frame 91 to execute the image recognition processing again and a method of touching the area inside the frame 91 on the screen to display information of a next candidate (menu item) in the descending order.

If the deleting mark 92 is touched, the frame 91 is erased. Then the user touches other position of the cooked food image to execute the recognition processing again. In this way, the frame 91 having the touched position coordinate (X, Y) as a center thereof is displayed on the captured image 81 again. In the commodity recognition apparatus 1, the recognition processing of the cooked food in the frame 91 is executed, and the menu items ranked from the first to the fourth in the candidate order in the descending order of similarity degree are selected. Then the name, price and calorie of the menu item ranked at the first in the candidate order are displayed in the frame 91. As the area of the recognition image differs from that in the last time due to different touched positions, there is a high possibility that the menu item is correctly recognized from the cooked food image through a new recognition processing.

Figure 16:
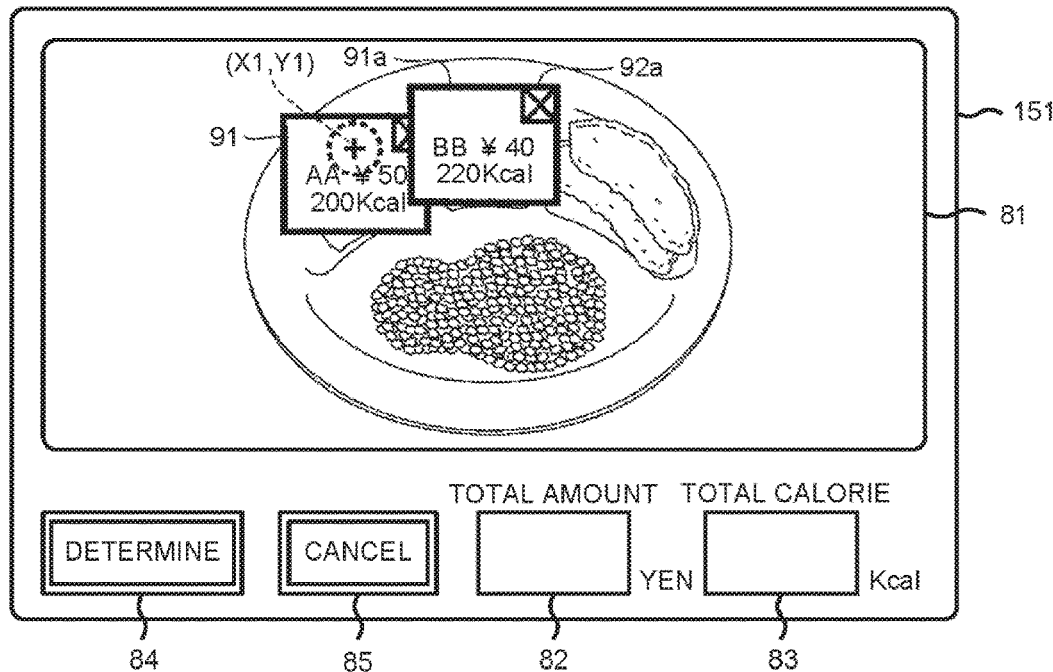
FIG. 16 is a schematic view illustrating an example of a screen displayed after an area inside a frame is touched through the screen shown in FIG. 15.
Figure 17:
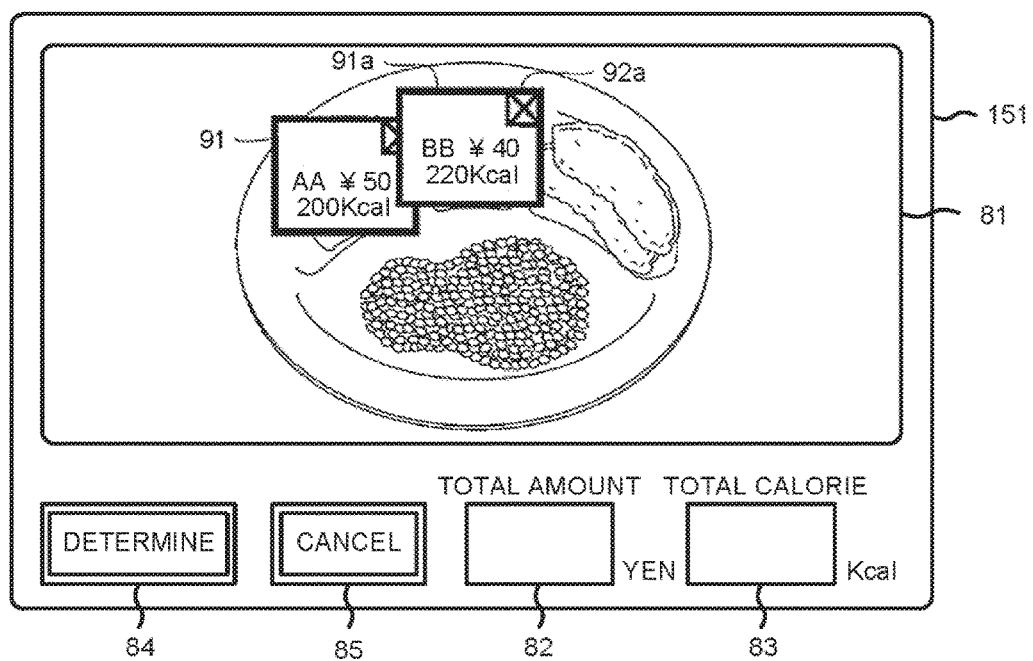
FIG. 17 is a schematic view illustrating an example of a screen displayed after the cooked food item is recognized from the screen shown in FIG. 16.

On the other hand, if the area inside the frame 91 on the screen is touched as shown in FIG. 16, the display content in the frame 91 is switched to information of the next menu item in the descending candidate order, as shown in FIG. 17. Further, the total amount and the total calorie of the recognized cooked food are updated. Thus, in a case in which the menu item ranked below the second in the candidate order is recognized as the correct menu item, it is possible to correct the information in the frame 91 to the information of the correct menu item through a simple operation.

The user repeats the touching operation described above until all the cooked food placed in the container 3 are correctly recognized. Then, if all the cooked food are recognized, the user touches the "determine" button 84. In this way, the settlement processing for the cooked food placed in the container 3 is executed with electronic money, and a receipt thereof is issued from the receipt issuing port 16. Further, the personal user history information is sent from the commodity recognition apparatus 1 to the database server 41, and the usage history information of the user stored in the database 40 is updated.

As stated above, the commodity recognition apparatus 1 recognizes the items of the cooked food placed in the container 3 one by one instead of recognizing the container 3 in which the cooked food is placed. Thus, a constraint such as the one-to-one correspondence between the container 3 and the cooked food and the arrangement of special information medium applied to the container 3 is not required, and thus, the dining facility such as a cafeteria can be used efficiently.

The commodity recognition apparatus 1 not only recognizes the cooked food placed in the container, but also adds up the prices of the cooked food to calculate the total amount. Then the commodity recognition apparatus 1 automatically settles the payment of the recognized cooked food with the electronic money data of the IC card read by the card RW 18. The commodity recognition apparatus 1 not only recognizes the cooked food but also settles the payment, and thus, the dining facility such as a cafeteria can be used efficiently.

Even if the recognition result of the commodity recognition apparatus 1 is incorrect, it can be corrected easily through a simple operation.

The present invention is not limited to the embodiment described above.

For example, it is exemplified in the embodiment described above that if the change receiving module 66 receives an instruction of changing the candidate, information of next menu item ranked below the current one in a descending candidate order is displayed. However, it can also be performed that information of all the menu items ranked below the current one is output and displayed for the user to select, and information of the menu item properly selected by the user from the information mentioned above is output to display it in the frame 91.

In the embodiment described above, the commodity recognition apparatus 1 adopting the electronic money settlement is exemplified. However, no specific limitation is given to the settlement method. For example, the credit card settlement or cash settlement can also be applied. Alternatively, the commodity recognition apparatus 1 does not include the settlement function. In this case, the commodity recognition apparatus 1 is connected with a settlement terminal such as a POS (Point Of Sales) terminal through a communication line. Then the commodity recognition apparatus 1 outputs information of the recognized cooked food item to the POS terminal.

It is exemplified in the embodiment described above that the recognition dictionary file 50 is stored in the auxiliary storage device 24 of the commodity recognition apparatus 1. However, the storage location of the recognition dictionary file 50 is not limited to the auxiliary storage device 24. For example, the recognition dictionary file 50 may be stored in a storage device attached outside the commodity recognition apparatus 1, and the CPU 21 accesses the storage device as needed to retrieve the data of the recognition dictionary file 50.

It is also exemplified in the embodiment described above that the frame 91 is a rectangular shaped frame of which the vertical length is "a" and the horizontal length is "b". However, no specific limitation is given to the size and the shape of the frame 91. Further, a function of changing the size of the frame displayed on the panel display module 151 may be included in the apparatus. With such a function, the image of the cooked food can be surrounded by a frame correctly, thus, a high recognition rate can be expected.

In the embodiment described above, it is programmed that the menu item is recognized from the image every time the image is touched. However, the present embodiment is not limited to this. For example, it may be programmed that the coordinates of the touched positions are stored in sequence, and the menu item is sequentially recognized from the image in an area specified with each coordinate if a recognition operation is instructed after that. In this way, the image recognition for all the cooked food touched is stared after the user touches a plurality of cooked food.

Further, it is exemplified in the embodiment described above that cooked food placed in a container is recognized. However, the commodity subject to the recognition may also be a bread and the like other than the cooked food. In the embodiment described above, the calorie is described as an example of the parameter derived for the standard quantity of a commodity. However, the parameter is not limited to calorie. For example, the parameter may be nutritional ingredient such as protein, lipid, calcium, and the like.

Moreover, in the embodiment described above, the control program for realizing the function of the invention is pre-recorded in the ROM 22 or the auxiliary storage device 24 serving as program storage module inside the apparatus. However, the present invention is not limited to this. Same programs may be downloaded to the apparatus from a network. Alternatively, same programs recorded in a recording medium may also be installed in the apparatus. The form of the recording medium is not limited as long as the recording medium can store programs like a CD-ROM and a memory card and is readable by an apparatus. Further, the function realized by an installed or downloaded program can also be realized through the cooperation with an OS (operating system) installed in the apparatus. Further, the program of the present embodiment may be incorporated in a portable information terminal having a communication function such as a mobile phone or a so-called PDA to realize the function.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:
   a memory configured to store computer executable instructions; and
   a processor configured to execute the computer executable instruction to perform operations, the operations comprising:
   photographing an image capturing area including a plurality of commodities to capture an image where the plurality of commodities are imaged;
   displaying the image where the plurality of commodities are imaged on a display screen;
   receiving a selection input on any position on the image;
   counting a number of frames displayed on the image;
   displaying a frame of a predetermined size on the image to distinguish, from the other commodities, one commodity which is assumed to be displayed on the position on which the selection input is received as a recognition object in response to the selection input when a count value obtained by the counting is zero;
   determining a position on which an instruction input is received in response to the selection input when the count value is one or more;
   displaying a frame of the predetermined size on the image to distinguish, from the other commodities, one commodity which is assumed to be displayed on the position on which the selection input is received, as a recognition object if the position on which the instruction input is received is outside the frame;
   recognizing a candidate of the commodity assumed to be displayed in the frame according to the feature amount of the image in the area surrounded by the frame;
   outputting information of a best candidate commodity among the candidates of the commodity recognized;
   receiving a change instruction for the best candidate commodity for one commodity assumed to be displayed in the frame if the position on which the instruction input is received is inside the frame; and
   outputting information of the commodity other than the best candidate selected from the candidates if the change instruction for the candidate of the commodity is received.

2. The apparatus according to claim 1, wherein the operations further comprise:
   erasing a frame to which a deleting mark is given if the position on which the instruction input is received is the deleting mark given to the frame.

3. The apparatus according to claim 2, wherein the operations further comprise:
   counting down the count value every time the frame is erased.

4. The apparatus according to claim 1, wherein the operations further comprise:
   calculating a similarity degree between a parameter indicating appearance feature amount of each commodity and feature amount of an image in an area surrounded by the frame border for each commodity and recognizes candidates in the descending order of similarity degree;
   determining that the commodity having the highest similarity degree is the best candidate of the commodity and outputs information of the commodity; and
   sequentially selecting a next candidate commodity of which the similarity degree is ranked just below that of the current candidate and outputs information of the candidate commodity selected every time a change instruction is received.

5. The apparatus according to claim 1, wherein the operations further comprise:
   displaying the frame having the position as a center thereof an instruction input on which is received.

6. The apparatus according to claim 1, wherein the operations further comprise:
   outputting information of a commodity in the frame to display; and
   making the display form of the frame different from the frame in which information of the commodity output is displayed.

7. A processing method, comprising:
   photographing an image capturing area including a plurality of commodities to capture an image where the plurality of commodities are imaged;
   displaying the image where the plurality of commodities are imaged on a display screen;
   receiving a selection input on any position on the image;
   counting a number of frames displayed on the image;
   displaying a frame of a predetermined size on the image to distinguish, from the other commodities, one commodity which is assumed to be displayed on the position on which the selection input is received as a recognition object in response to the selection input when a count value obtained by the counting is zero;
   determining a position on which an instruction input is received in response to the selection input when the count value is one or more;
   displaying a frame of the predetermined size on the image to distinguish, from the other commodities, one commodity which is assumed to be displayed on the position on which the selection input is received, as a recognition object if the position on which the instruction input is received is outside the frame;
   recognizing a candidate of the commodity assumed to be displayed in the frame according to the feature amount of the image in the area surrounded by the frame;
   outputting information of a best candidate commodity among the candidates of the commodity recognized;
   receiving a change instruction for the best candidate commodity for one commodity assumed to be displayed in the frame if the position on which the instruction input is received is inside the frame; and
   outputting information of the commodity other than the best candidate selected from the candidates if the change instruction for the candidate of the commodity is received.

8. The method according to claim 7 further comprising:
   erasing a frame to which a deleting mark is given if the position on which the instruction input is received is the deleting mark given to the frame.

9. The method according to claim 8 further comprising:
counting down the count value every time the frame is erased.

10. The method according to claim 7 further comprising:
calculating a similarity degree between a parameter indicating appearance feature amount of each commodity and feature amount of an image in an area surrounded by the frame border for each commodity and recognizes candidates in the descending order of similarity degree;
determining that the commodity having the highest similarity degree is the best candidate of the commodity and outputs information of the commodity; and
sequentially selecting a next candidate commodity of which the similarity degree is ranked just below that of the current candidate and outputs information of the candidate commodity selected every time a change instruction is received.

\* \* \* \* \*